D. H. MOSTELLER.
WATER HEATER.
APPLICATION FILED MAY 4, 1914.

1,138,593.

Patented May 4, 1915.

Witnesses:
Thomas A. Banning
Ephraim Banning

Inventor:
Dosier H. Mosteller
by Banning & Banning
Attys.

UNITED STATES PATENT OFFICE.

DOSIER H. MOSTELLER, OF CHICAGO, ILLINOIS, ASSIGNOR TO JOHN M. BERRY AND WILLIAM TINSLEY, BOTH OF CHICAGO, ILLINOIS.

WATER-HEATER.

1,138,593.  Specification of Letters Patent.  Patented May 4, 1915.

Application filed May 4, 1914. Serial No. 836,276.

*To all whom it may concern:*

Be it known that I, DOSIER H. MOSTELLER, a citizen of the United States, residing at Chicago, in the county of Cook and State of Illinois, have invented certain new and useful Improvements in Water-Heaters, of which the following is a specification.

This invention relates to a heating device operated by an electric current for raising water to a high temperature, or for producing steam if desired.

In the present invention, I have sought to provide a heater of the kind above noted which shall be capable of bringing a quantity of water to the boiling temperature in a very short space of time; to so combine and arrange the parts that the heat once generated will be retained for a long time after the device has ceased to operate; to utilize a series of tubes within which the water is heated, these tubes being designed to conduct the heat in the most efficient manner; to arrange heating coils adjacent the water tubes, these coils being independently removable should such an operation be necessary; and to generally arrange, proportion and design the parts to provide a very compact and efficient structure for the purpose intended.

The invention consists further in numerous other features of construction and combinations of parts as hereinafter described and claimed.

Figure 1:
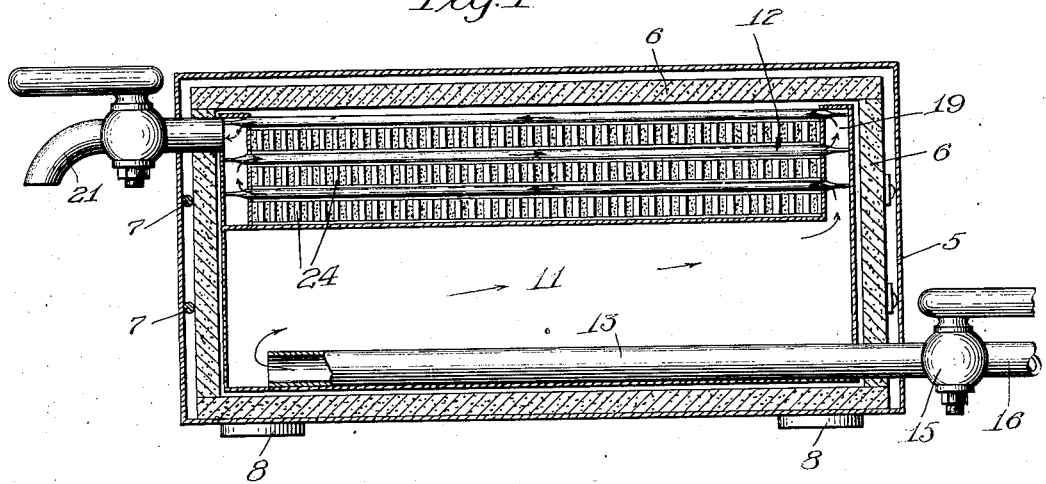
Figure 2:
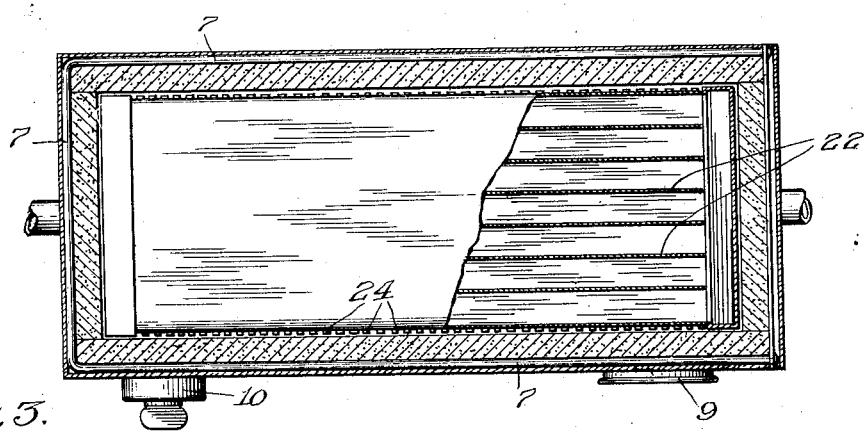
Figure 3:
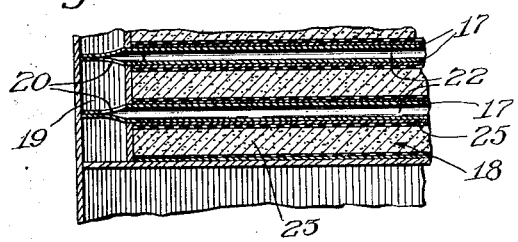
Figure 4:
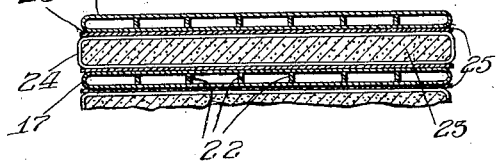

In the drawings: Figure 1 is a vertical longitudinal section through a device embodying the improved features of my invention; Fig. 2 is a horizontal section through the device; Fig. 3 is an enlarged detail showing the connections between the heating tubes and the hollow end members; and Fig. 4 is an enlarged detail showing in cross section the construction of the heating tubes.

In the embodiment of the invention illustrated, I have shown an outer shell or casing 5 of ornamental finish within which is housed an inner casing 6 preferably formed of a heat insulating substance. For this purpose, as well as for reasons of strength and durability, I have selected transite as a material for this inner casing. U-shaped rods 7 suitably secured in place surround the inner casing both to retain the constituent parts thereof in assembled relation, and to serve as spacing elements whereby an air chamber is provided between the inner and outer casings. Legs or rests 8 are disposed beneath the device to afford a proper support for the same. Upon one of the side faces, I have arranged a bushing 9 through which electrical conductors may pass to the interior of the heater, the central of the current utilized being effected by means of the switch 10.

Within the heating device are arranged two major elements, viz., the water reservoir 11 and the heating apparatus 12. A pipe connection 13 delivers water into the reservoir, the delivery end 14 thereof being located near one end of the reservoir for purposes to be hereafter explained. Exteriorly of the device a valve 15 is shown operatively positioned in the pipe 13 and capable of controlling the maximum and minimum rate of flow of liquid into the reservoir, although preferably not arranged to shut off entirely the inflow of water. The exterior end 16 of the pipe 13 is shaped to connect with any source of water supply, a convenient means for connection being obtained by the use of a rubber hose.

The heating apparatus consists essentially of a series of flattened tubes 17 formed preferably of copper, and heating elements 18 adjacent thereto. These flattened tubes are arranged between hollow end members 19, the ends of the tubes being closed and carried into the members in a manner to interrupt longitudinal communication therewithin, the connections between the tubes and members being rendered tight against leakage.

Communication between each of the flattened tubes and the hollow end members is established by the provision of slots 20 on alternate sides of the tube, so that these tubes are disposed in series arrangement, (see Fig. 3). An inspection of Fig. 1 discloses that a path of travel is provided commencing at the right hand end of the reservoir which alternates back and forth in the adjacent flattened tubes and terminates at the left hand end of the uppermost of said tubes, at which point a cock 21 is positioned to control the discharge of water. The total capacity of the water tubes thus formed is considerably less than that of the water reservoir 11.

Several details of construction are to be noted in connection with these tubes. Each is preferably formed by compressing a round copper tube as between opposing rollers until a very pronounced flat shape obtains. I have found it advisable for some purposes to take a tube of proper size and apply the necessary pressure to produce a flattened tube having a width of as much as three inches, the interior space between the flat walls not exceeding 1/32 of an inch. The tube interior is then sub-divided by the provision of longitudinal walls 22 which cause the liquid flowing therethrough to travel in several thin streams or sheets. When ready to be joined to the hollow end members, the ends of the tubes may be forced together as appears in Fig. 3, a slot 20 at each end extending across one of the flat sides being provided. These slots I arrange in opposite sides, so that in the assembled structure the tubes communicate with each other in a series arrangement.

Between each of the tubes sufficient space is allowed for the insertion of a block of insulating material 23, such as transite. Coils of wire 24 which I prefer should be flat or ribbon-like are wound around each block, these coils serving as heating means when energized by a current of electricity. When operatively positioned, a thin insulating strip 25, such as mica, is placed on each side of the block so wound to prevent shorting of the current against the copper tubes. Each heating element 18 consisting of the block and wire coiled therearound constitutes an independent unit, and may be separately removed from the device, if necessary. The wire coils I have shown connected at their ends in series arrangement, although a shunt winding might be used if found desirable.

In the device herein described, I have preferred to employ copper as the material for the water tubes, this being readily bendable to shape, and being an excellent conductor of heat. The flattened arrangement, whereby the space within affords but a very thin passage for water, brings the heated walls into much closer proximity with every portion of the water than would otherwise be possible. Furthermore, the area of exposed surface at the edges of the tubes when so formed is relatively negligible as compared with the area of the flat surfaces which are in intimate proximity with the heating coils at every point. Another very important feature is the provision of the interior walls which take the heat from the outer walls by conductivity and deliver the same to the thin body of water over a great area of surface intermediate the inside surfaces of the flat walls of the tube. Due to these principles of construction, I find it possible to raise the temperature of a body of cool water amounting to about a glassful to the boiling point in less than fifteen seconds.

The blocks 23 around which resistance wire is wound correspond very closely in shape and size to the copper tubes. Several advantages result from this. The tubes are spaced apart but very little distance, thus minimizing the distance through which the water must flow in the unheated hollow end members. Again, except at the very thin edges of these blocks, practically the entire surface of the wire coils apply heat directly against the water tubes. In the arrangement shown, the uppermost tube—that closest to the point of discharge—is heated directly from one side only. Since the temperature of the water close to the end of its travel must necessarily be the highest, this method of construction is the most efficient.

From Fig. 1, it appears that the total capacity of the water tubes is considerably less than that of the water reservoir. This arrangement is preferred, since by subjecting only a small volume of water to the action of the heating elements, the desired temperature may quickly be attained. The body of water remaining within the reservoir is affected only indirectly by this heating action. The insulated construction which I have provided insures, moreover, the retention of considerable heat within the device, such as to cause the water in the reservoir to be warmed, and kept at a relatively warm temperature, even after the heating coils are no longer energized. The value of such an arrangement is especially apparent when the heater is operated intermittently.

The inner casing which I have described as consisting preferably of some heat and electrical insulating material also serves to retain within the device the heat which is generated. It is unnecessary to protect the exposed edges of the copper tubes or the block around which the wire is wound as contact therewith results in no harm. As an additional preventative against the loss of heat, the air insulating space between the inner and outer casings is provided. In this space the wires leading to the switch and bushing are located, so that no valuable space within the appliance is taken for this purpose.

In operation, the device is connected to a pipe having a head or pressure of water therein. When the valve 15 is opened, the water circulates through the reservoir and each of the heating tubes, its discharge being checked only by the cock 21. During the periods of operation, when the water tubes are being heated, it is intended that the valve 15 should be opened, and that the cock 21 should be manipulated to allow discharge of as much hot water as is required. Obviously the rate of flow of water through the heater is thus controlled. Inasmuch, furthermore, as the number of heat units delivered remains practically constant, the temperature of the water discharging from the cock 21 varies according to the rate at which the water is allowed to flow through the heating tubes. Regulation of the inflow and outflow of water, therefore, results in control of temperature of discharging water.

In the arrangement illustrated, the flow of water through the tubes is dependent, among other things, upon the head or pressure within the connected pipe line. This form of construction is admirably suited where the device is to be used for bars, fountains, and similar purposes. It is manifest that, where such plumbing connections are not available, the reservoir could be located above the heating tubes, so as to cause a flow of water therethrough by the action of gravity. Such modifications in construction and arrangement are clearly possible and yet come within the scope of my invention.

I claim:

1. In a water heater, the combination of a heat insulating casing, a water reservoir adjacent one of the walls of said casing, a plurality of water tubes extending in parallel and close relation intermediate said reservoir and the opposite wall of said casing, and of total capacity less than said reservoir, said tubes being interconnected and having the discharge end thereof located adjacent said opposite wall, and heating elements arranged one intermediate each adjacent pair of tubes, and one intermediate said reservoir and the tube adjacent thereto, substantially as described.

2. In a water heater, the combination of a heat insulating casing, a water reservoir adjacent one of the walls of said casing, a plurality of water tubes extending in parallel and close relation intermediate said reservoir and the opposite wall of said casing, and of total capacity less than said reservoir, said tubes consisting of interconnected straight conduits of flat and widened form, whereby the flat interior walls are spaced closely together, heating elements intermediate said tubes of a shape and size corresponding closely therewith, and resistance wires surrounding said elements adapted to generate heat when energized by an appropriate electric current, the arrangement of said tubes and elements being such that practically the entire heating surface of each element is maintained in intimate proximity with substantially the entire surface of the adjacent tubes, substantially as described.

3. In a water heater, the combination of a heat insulating casing, a water reservoir adjacent one of the walls of said casing, a plurality of water tubes extending in parallel and close relation intermediate said reservoir and the opposite wall of said casing, and of total capacity less than said reservoir, said tubes consisting of a plurality of straight conduits of flat and widened form having the flat interior walls thereof spaced closely together, divisional walls within each of said tubes extending in a longitudinal direction thereof, heating elements intermediate said tubes of a shape and size corresponding closely therewith, and resistance wires surrounding said elements adapted to generate heat when energized by appropriate electric current, the arrangement of said tubes and elements being such that practically the entire heating surface of each element is maintained in intimate proximity with substantially the entire surface of the adjacent tubes and divisional walls therein, substantially as described.

4. In a water heater, the combination of a reservoir, a plurality of interconnected water tubes extending in parallel and close relation thereto, and of total capacity less than said reservoir, and heating elements arranged one intermediate each adjacent pair of tubes, and one intermediate said reservoir and the tube adjacent thereto, substantially as described.

DOSIER H. MOSTELLER.

Witnesses:
EPHRAIM BANNING,
WM. P. BOND.